United States Patent
Krone et al.

(10) Patent No.: US 12,486,642 B2
(45) Date of Patent: Dec. 2, 2025

(54) REMOTE CONTROL OF AN IMPLEMENT OF A MACHINE

(71) Applicant: Caterpillar Inc., Peoria, IL (US)

(72) Inventors: Bradley Paul Krone, Dunlap, IL (US); Matthew E. Bengry, Peoria Heights, IL (US)

(73) Assignee: Caterpillar Inc., Peoria, IL (US)

( * ) Notice: Subject to any disclaimer, the term of this patent is extended or adjusted under 35 U.S.C. 154(b) by 283 days.

(21) Appl. No.: 18/317,455

(22) Filed: May 15, 2023

(65) Prior Publication Data

US 2024/0384507 A1 Nov. 21, 2024

(51) Int. Cl.
*E02F 9/20* (2006.01)
*E02F 3/84* (2006.01)

(52) U.S. Cl.
CPC .............. *E02F 9/205* (2013.01); *E02F 3/841* (2013.01); *E02F 3/844* (2013.01)

(58) Field of Classification Search
CPC ............ E02F 9/205; E02F 3/841; E02F 3/844
See application file for complete search history.

(56) References Cited

U.S. PATENT DOCUMENTS

| | | | |
|---|---|---|---|
| 5,552,983 A | 9/1996 | Thornberg et al. | |
| 5,987,371 A * | 11/1999 | Bailey | E02F 3/847 |
| | | | 701/472 |
| 6,062,317 A * | 5/2000 | Gharsalli | E02F 3/845 |
| | | | 701/50 |
| 9,816,249 B2 * | 11/2017 | Padilla | E02F 9/265 |
| 10,766,530 B2 | 9/2020 | Wang et al. | |
| 12,371,878 B2 * | 7/2025 | Sadilek | G05B 13/027 |
| 2013/0034416 A1 | 2/2013 | Ogita et al. | |
| 2014/0136020 A1 * | 5/2014 | Halder | G05D 1/0276 |
| | | | 701/1 |
| 2017/0284069 A1 | 10/2017 | Machida et al. | |
| 2021/0276416 A1 | 9/2021 | Hedrington | |
| 2022/0136204 A1 * | 5/2022 | Kushner | E02F 3/422 |
| | | | 37/403 |
| 2023/0295901 A1 * | 9/2023 | Bridenbaugh | E02F 9/264 |
| | | | 701/2 |
| 2025/0027292 A1 * | 1/2025 | Tevis | E02F 9/26 |

FOREIGN PATENT DOCUMENTS

JP 2018072945 A 5/2018
WO 2019138466 A1 7/2019

* cited by examiner

*Primary Examiner* — Richard M Camby

(57) ABSTRACT

A controller may identify a reference heading for a mobile machine. The controller may receive, from a remote control device for the mobile machine, a command to actuate an implement of the mobile machine. The controller may cause actuation of the implement based on the command with respect to the reference heading for the mobile machine regardless of an actual heading of the mobile machine.

20 Claims, 5 Drawing Sheets

REMOTE CONTROL OF AN IMPLEMENT OF A MACHINE

TECHNICAL FIELD

The present disclosure relates generally to manually controlled machines and, for example, to remote control of an implement of a machine.

BACKGROUND

Machines such as dozers and motor graders are used to perform a variety of tasks including moving, digging, loosening, and carrying different materials at a worksite. For example, these machines may include ground engaging implements used to engage a work surface to move material and/or otherwise alter the work surface at a work site. The machines may operate in a manual manner to perform these tasks in response to commands input at a remote control device. For example, an operator located off board a machine may control the machine via a remote control device.

Generally, remote control operation of a machine may be from a machine-centric perspective. In other words, the machine may interpret commands from a remote control device from the perspective of the machine, rather than from the perspective of an operator of the remote control device. For example, if the machine is moving away from the operator, and the operator pushes an implement-control joystick of the remote control device to the right, the machine may respond by performing a clockwise rotation of an implement from the perspective of the machine, which may also be a clockwise rotation from the perspective of the operator. However, if the machine is moving toward the operator, and the operator pushes the implement-control joystick to the right, the machine may again respond by performing a clockwise rotation of the implement from the perspective of the machine, but which may be a counterclockwise rotation from the perspective of the operator. Accordingly, machine-centric remote control may be confusing to the operator resulting in slow, inefficient operation of the machine that wastes machine hours and fuel (or another energy source), among other examples.

The controller of the present disclosure solves one or more of the problems set forth above and/or other problems in the art.

SUMMARY

A controller of a mobile machine having an implement may include one or more memories and one or more processors. The one or more processors may be configured to receive, from a remote control device for the mobile machine, an indication to use a current heading of the mobile machine as a reference heading for the mobile machine. The one or more processors may be configured to receive, from the remote control device, a command to actuate an implement of the mobile machine, the command to actuate the implement indicating a rotation of the implement. The one or more processors may be configured to detect an actual heading of the mobile machine that is different from the reference heading. The one or more processors may be configured to cause actuation of the implement according to an inversion of the command, or according to the command without inversion, based on whether an angular difference between the actual heading and the reference heading is greater than a first threshold for inversion of commands or less than a second threshold for non-inversion of commands.

A method may include identifying, by a controller, a reference heading for a mobile machine. The method may include receiving, by the controller from a remote control device for the mobile machine, a command to actuate an implement of the mobile machine. The method may include causing, by a controller, actuation of the implement based on the command with respect to the reference heading for the mobile machine regardless of an actual heading of the mobile machine.

A mobile machine may include an undercarriage configured to propel the mobile machine, a frame supported on the undercarriage, an implement movable with respect to the frame, and a controller. The controller may be configured to receive, from a remote control device for the mobile machine, a command to actuate the implement. The controller may be configured to cause actuation of the implement based on the command with respect to a reference heading for the mobile machine regardless of an actual heading of the mobile machine.

DETAILED DESCRIPTION

This disclosure relates to a control system, which is applicable to any machine that is operable by remote control.

Figure 1:
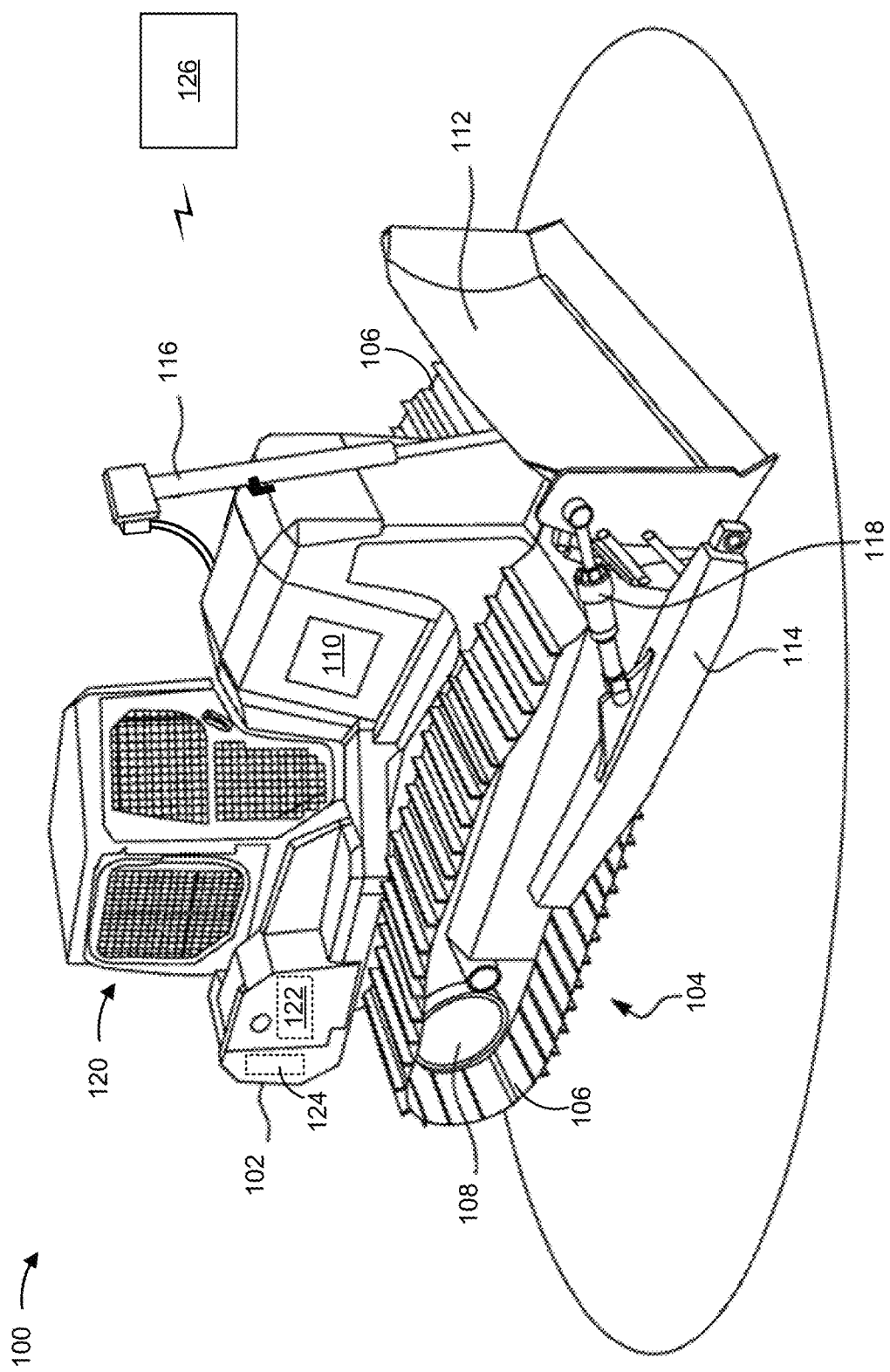
FIG. 1 is a diagram of an example machine.

FIG. 1 is a diagram of an example machine 100. Machine 100 may perform earth moving, excavation, or another operation associated with an industry such as construction or mining, among other examples. For example, as illustrated in FIG. 1, machine 100 is a dozer. However, machine 100 may be, for example, an excavator, a motor grader, a plow, a paver, a skid steer loader, or a compact wheel loader, among other examples.

Machine 100 includes a frame 102 that is supported by an undercarriage 104 used to propel machine 100 in a forward direction and/or a rearward direction. In other words, the machine 100 is a mobile machine. The undercarriage 104 is configured to engage a ground surface, such as a road or another type of terrain. As shown, the undercarriage 104 includes a pair of endless tracks 106 driven by respective drive wheels 108. Although machine 100 is illustrated as having tracks 106, the undercarriage 104 may additionally, or alternatively, include one or more wheels for propelling machine 100.

The frame 102 supports a prime mover 110. The prime mover 110 may include an engine (e.g., an internal combustion engine), such as a diesel engine, a gasoline engine, or a gaseous fuel engine, among other examples. Additionally, or alternatively, the prime mover 110 may include an electric motor (e.g., for electric powering of machine 100 or hybrid powering of machine 100 with the engine). The prime mover 110 is configured to provide power to drive tracks 106. Furthermore, the prime mover 110 is configured to provide power to an implement 112 (e.g., by driving one or more hydraulic pumps that provide pressurized fluid to one or more actuators of machine 100).

In FIG. 1, the implement 112 (e.g., a work implement) is illustrated as a blade. However, the implement 112 may be, for example, a bucket, a scoop, or a moldboard, among other examples. The implement 112 is movable with respect to the frame 102. For example, the implement 112 may be pivotally connected to the frame 102 by arms 114 on each side of the machine 100. One or more first hydraulic cylinders 116 may be coupled to the frame 102 to support the implement 112 in the vertical direction and allow the implement 112 to move up or down vertically. Additionally, one or more second hydraulic cylinders 118 may be included on each side of the machine 100 to allow a pitch or an angle (e.g., an angle of attack) of the implement 112 to change. The first and second hydraulic cylinders 116, 118 may be actuators that receive actuation instructions to adjust, lift, lower, or otherwise move and/or position the implement 112. In some examples, the implement 112 may be connected to the frame 102 by a boom assembly (e.g., including a boom member and a stick member) configured to be articulated relative to the frame 102 by one or more hydraulic cylinders.

An operator station 120 may be supported on the frame 102. The operator station 120 may include one or more displays and/or one or more operator controls to operate and/or drive the machine 100. For example, the operator controls may include a joystick, a lever, and/or a knob, among other examples. The machine 100 includes a controller 122 for electrically controlling various aspects of the machine 100. For example, the controller 122 may send and receive signals from various components of the machine 100 during the operation of the machine 100.

The machine 100 may include one or more sensors 124. A sensor 124 may include one or more devices capable of detecting a characteristic associated with the machine 100, such as a heading or a location of the machine 100. The one or more sensors 124 may include a compass sensor, a magnetometer, a global navigation satellite system (GNSS) sensor (e.g., a global positioning system (GPS) sensor), a gyroscope, an accelerometer, and/or an inertial measurement unit (IMU) (e.g., that includes one or more gyroscopes and one or more accelerometers), among other examples.

The machine 100 may be remotely controllable by an operator located off board machine 100 via a remote control device 126. The remote control device 126 may include one or more input devices configured to control propulsion of the machine 100, steering of the machine 100, and/or actuation (e.g., movement) of the implement 112. For example, the input devices may include one or more joysticks, one or more control sticks, and/or one or more touchpads. Based on inputs provided via the input devices, the remote control device 126 may transmit (e.g., wirelessly, as radio signals) commands to the controller 122. The controller 122 may interpret the commands and cause the machine 100 to operate in accordance with the commands.

As indicated above, FIG. 1 is provided as an example. Other examples may differ from what is described with regard to FIG. 1.

Figure 2:
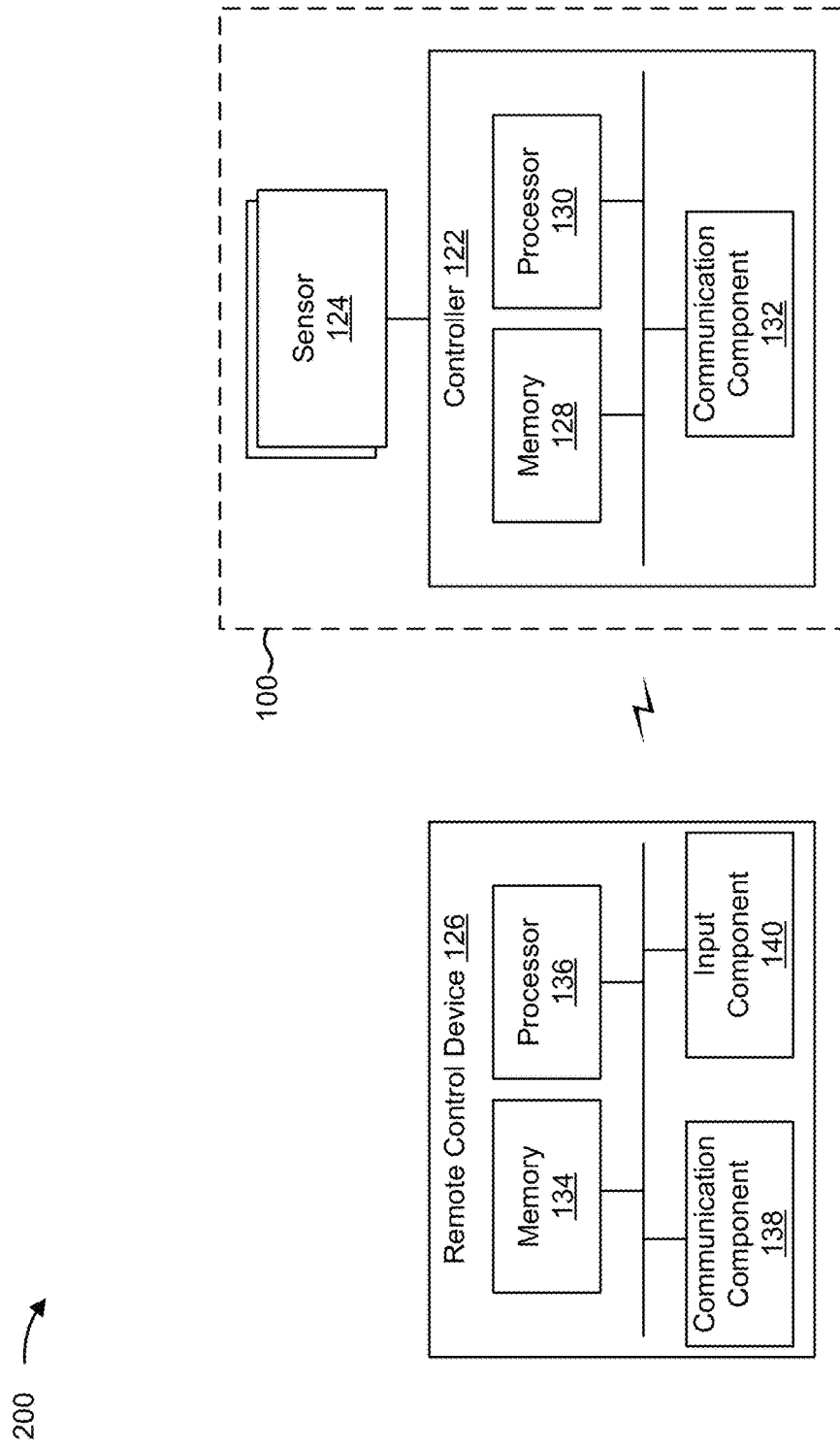
FIG. 2 is a diagram of an example control system.

FIG. 2 is a diagram of an example control system 200. The control system 200 (e.g., a remote control system) may include the controller 122, the one or more sensors 124, and/or the remote control device 126. The controller 122 may be configured to perform operations associated with remote control of the implement 112 and/or the undercarriage 104.

The controller 122 may include one or more memories 128 and one or more processors 130. A processor 130 may include a central processing unit, a graphics processing unit, a microprocessor, a controller, a microcontroller, a digital signal processor, a field-programmable gate array, an application-specific integrated circuit, and/or another type of processing component. The processor 130 may be implemented in hardware, firmware, or a combination of hardware and software. The processor 130 may include one or more processors capable of being programmed to perform one or more operations or processes described elsewhere herein. A memory 128 may include volatile and/or nonvolatile memory. For example, the memory 128 may include random access memory (RAM), read only memory (ROM), a hard disk drive, and/or another type of memory (e.g., a flash memory, a magnetic memory, and/or an optical memory). The memory 128 may include internal memory (e.g., RAM, ROM, or a hard disk drive) and/or removable memory (e.g., removable via a universal serial bus connection). The memory 128 may be a non-transitory computer-readable medium. The memory 128 may store information, one or more instructions, and/or software (e.g., one or more software applications) related to the operation of the controller 122. The memory 128 may include one or more memories that are coupled (e.g., communicatively coupled) to the one or more processors 130, such as via a bus. Communicative coupling between a processor 130 and a memory 128 may enable the processor 130 to read and/or process information stored in the memory 128 and/or to store information in the memory 128.

In addition, the controller 122 may include a communication component 132. The communication component 132 may enable the controller 122 to communicate with other devices via a wired connection and/or a wireless connection. For example, the communication component 132 may include a receiver, a transmitter, a transceiver, a modem, a network interface card, and/or an antenna. In one example, the controller 122 may communicate wirelessly with the remote control device 126 using the communication component 132. The communication component 132 may be coupled with the one or more memories 128 and/or the one or more processors 130 via the bus.

The remote control device 126 may also include one or more memories 134, one or more processors 136, and/or a communication component 138, in a similar manner as described above. In addition, the remote control device 126 may include an input component 140. The input component 140 may include one or more joysticks, one or more control sticks, and/or one or more touchpads. The input component 140 may be coupled with the one or more memories 134 and/or the one or more processors 136 via the bus. Inputs provided to the input component 140 may cause the input component 140 to generate and provide electrical signals indicative of the inputs to the processor(s) 136. The processor(s) 136 may determine commands based on the electrical signals, and the processor(s) 136 may generate and provide electrical signals indicative of the commands to the communication component 138 for transmission (e.g., as electrical signals in a case of a wired connection to the machine 100, or as radio signals in a case of a wireless connection with the machine 100).

The controller 122 may identify a reference heading for the machine 100. A "heading" of the machine 100 may refer to a forward direction (e.g., relative to a ground surface) in which the machine 100 is traveling (e.g., where a front of the machine 100 may be defined by a location of the implement 112 and/or a direction in which the operator station 120 faces). A heading of the machine 100 may be expressed as a compass heading, a GPS heading, an angle (e.g., an azimuth), or the like.

To identify the reference heading, the controller 122 may receive, from the remote control device 126, an indication to use a current heading of the machine 100 (e.g., a heading of the machine 100 at the time the indication is sent and/or received) as the reference heading for the machine 100. For example, the remote control device 126 may receive an input from an operator (e.g., via a button) indicating that the reference heading is to be set as the current heading. In response to the input, the remote control device 126 may transmit, and the controller 122 may receive, the indication. The controller 122 may receive an additional indication each time the operator desires to reset the reference heading.

The operator may provide the input to set the reference heading as the current heading when the machine 100 is travelling away from the operator (e.g., roughly on a line defined by a direction in which the operator is facing). Directional inputs to the remote control device 126 can be mapped to the reference heading, as described herein, thereby facilitating more intuitive control of the machine 100 using the remote control device 126. However, in some examples, the operator may provide the input to set the reference heading as the current heading when the machine 100 is traveling toward the operator, transverse to the operator, or the like, which would result in an unintuitive mapping for the remote control device 126 if the current heading were to be used as the reference heading. Accordingly, the controller 122 may reject the indication and/or transmit a notification to the remote control device 126 indicating that the reference heading is not being set to the current heading. For example, the indication to use the current heading as the reference heading, sent by the remote control device 126, may also identify an orientation of the remote control device 126 (e.g., based on data collected by a compass, a GNSS, an IMU, or the like, of the remote control device 126). Continuing with the example, the controller 122 may compare the orientation to the current heading of the machine 100, and the controller 122 may reject the indication and/or transmit the notification based on the orientation and the current heading differing (e.g., in angle) by a threshold amount.

Based on receiving the indication (e.g., that is not rejected), the controller 122 may detect the current heading of the machine 100 using the sensor 124. For example, the controller 122 may detect the current heading based on a compass heading of the machine 100, a GNSS heading of the machine 100, or an output of an IMU of the machine 100. The controller 122 may store (e.g., in the memory 128 of the controller 122) information identifying the current heading of the machine 100 as the reference heading.

Additionally, or alternatively, to identify the reference heading, the controller 122 may select a cardinal direction (e.g., using a fixed selection, based on a heading of the machine 100, or the like), and the controller 122 may map (e.g., code) the reference heading to the particular cardinal direction. Similarly as described above, the controller 122 may store information identifying the particular cardinal direction as the reference heading. Additionally, or alternatively, the controller 122 may identify the reference heading as a heading of the machine 100 used when steering of the machine 100, via the remote control device 126, was last performed. Similar to as described above, the controller 122 may store information identifying the heading as the reference heading.

After the reference heading has been set, the controller 122 may receive, from the remote control device 126, a command to actuate an implement 112 of the machine 100. For example, the command may be based on an input made by the operator to the remote control device 126 (e.g., using a joystick of the remote control device 126). The command to actuate the implement 112 may indicate a rotation of the implement 112 and/or a translation of the implement 112 relative to a work surface (e.g., a movement of the implement 112 parallel or substantially parallel to the work surface). The rotation of the implement 112 relative to a work surface may be rotation about a first axis parallel to the work surface (e.g., an x-axis), rotation about a second axis parallel to the work surface and perpendicular to the first axis (e.g., a y-axis), and/or rotation about a third axis perpendicular to the work surface (e.g., a z-axis). For example, the command to actuate the implement 112 may be an angle command and/or a tilt command for the implement 112. The angle command may be a blade angle command for a blade that indicates right-side forward rotation or left-side forward rotation of the blade. The tilt command may be a blade tilt command for a blade that indicates clockwise or counter-clockwise rotation of the blade to change an angle between a cutting edge of the blade and a work surface. In some examples, the command to actuate the implement 112 may be a command for a boom assembly that includes the implement 112, such as a swing left or right command, a stick away or close command, and/or a curl in or out command. Additionally, or alternatively, the controller 122 may receive, from the remote control device 126, a command to propel (e.g., forward or in reverse) and/or steer (e.g., left or right) the machine 100.

The controller 122 may receive the command to actuate the implement 112 (or propel or steer the machine 100) when an actual heading of the machine 100 is facing away from the remote control device 126, is facing toward the remote control device 126, is transverse to the remote control device 126, or the like. The actual heading of the machine 100 at the time of the command may dictate how the controller 122 processes the command. Accordingly, the controller 122 may detect the actual heading of the machine 100, which may be different (e.g., may have an angular difference) from the reference heading, using the sensor 124, in a similar manner as described above.

The controller 122 may cause actuation of the implement 112 in response to the command. The controller 122 may cause actuation of the implement 112 by outputting a signal (e.g., to a hydraulic system of the machine 100) that causes driving of one or more hydraulic pumps to provide pressurized fluid, in a particular direction, to one or more actuators of the machine 100. The controller 122 may cause actuation of the implement 112 based on the command with respect to the reference heading for the machine 100 and regardless of the actual heading of the machine 100 (e.g., the command is always performed with respect to the reference heading). For example, if the command indicates a clockwise rotation of the implement 112 (e.g., from the perspective of the operator), then the controller 122 may cause a clockwise rotation of the implement 112 with respect to the reference heading, even if that rotation is a counter-clockwise rotation with respect to the actual heading (e.g., from the perspective of the machine 100).

In order to perform the command with respect to the reference heading, the controller 122 sometimes may invert the command, and other times, the controller 122 may perform the command without inversion (e.g., perform the command as is). Whether the controller 122 inverts the command or performs the command without inversion may be based on an angular difference between the reference heading and the actual heading. For an angular difference in a range from 0 to X degrees, the reference heading and the actual heading may be referred to as "non-opposing headings," and for an angular difference in a range from greater than X degrees to 180 degrees, the reference heading and the actual heading may be referred to as "opposing headings," where X represents an angle threshold between 0 and 180 degrees (e.g., 90 degrees), as shown further in connection with FIG. 3. The angle threshold may be referred to herein as a "switching angle."

In some examples, the reference heading and the actual heading are opposing headings (e.g., the reference heading is facing away from the remote control device 126 and the actual heading is facing toward the remote control device 126). Here, to cause actuation of the implement 112 based on the command with respect to the reference heading, the controller 122 may cause actuation of the implement 112 according to an inversion of the command. For example, if the command is to increase a clockwise rotation of the implement 112, from the perspective of the operator, then the controller 122 may invert the command and cause a counter-clockwise rotation of the implement 112 from the perspective of the machine 100. In some examples, the reference heading and the actual heading are non-opposing headings (e.g., the reference heading is facing away from the remote control device 126 and the actual heading is facing away from the remote control device 126). Here, to cause actuation of the implement 112 based on the command with respect to the reference heading, the controller 122 may cause actuation of the implement 112 according to the command without inversion (e.g., according to the command as is). For example, if the command is to increase a clockwise rotation of the implement 112, from the perspective of the operator, then the controller 122 may perform the command as is and cause a clockwise rotation of the implement 112 from the perspective of the machine 100.

In some implementations, the controller 122 may invert the command or perform the command without inversion with hysteresis. For example, the controller 122 may cause actuation of the implement 112 according to an inversion of the command or according to the command without inversion based on whether an angular difference between the actual heading and the reference heading is greater than a first threshold for inversion of commands or less than a second threshold for non-inversion of commands. The first threshold for inversion of commands may be greater than the second threshold for non-inversion of commands. Whether the controller 122 inverts commands when the angular difference is between the first threshold and the second threshold may be based on whether the controller 122 had been inverting commands or performing commands without inversion just prior to the angular difference falling between the first threshold and the second threshold.

Figure 4:
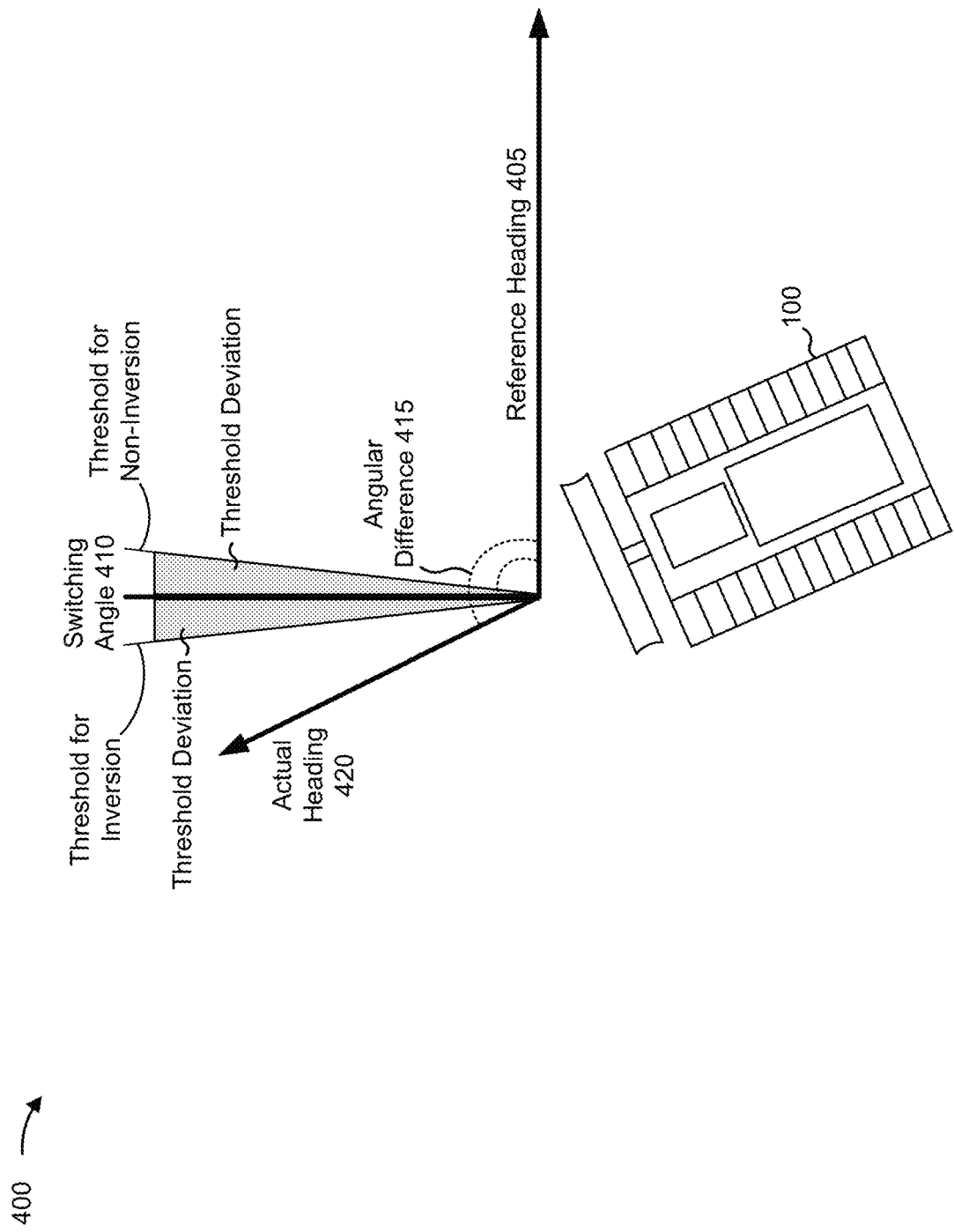
FIG. 4 is a diagram of an example associated with remote control of an implement of a machine.

In other words, whether the controller 122 inverts the command or performs the command without inversion may be based on an angular difference between the reference heading and the actual heading having a threshold deviation (e.g., 10% deviation, 20% deviation, or the like) from the switching angle, as shown further in connection with FIG. 4. As an example, the controller 122 may cause actuation of the implement 112 according to an inversion of the command based on an angular difference between the reference heading and the actual heading having the threshold deviation from the switching angle. In other words, the actual heading of the machine 100 changing from non-opposing to opposing the reference heading, at the switching angle, does not immediately trigger inversion of the command until the threshold deviation from the switching angle (e.g., an amount greater than the switching angle) is reached. Similarly, the actual heading of the machine 100 changing back from opposing to non-opposing the reference heading, at the switching angle, does not immediately trigger performing the command without inversion until the threshold deviation from the switching angle (e.g., an amount less than the switching angle) is reached. In this way, ping-ponging between inversion of the command and performing the command without inversion, which could be confusing to the operator, may be avoided.

As another example, whether the controller 122 inverts the command or performs the command without inversion may be based on whether an angular difference between the reference heading and the actual heading satisfies the switching angle for a threshold time duration (e.g., 5 seconds, 30 seconds, or the like). As an example, the controller 122 may cause actuation of the implement 112 according to an inversion of the command based on an angular difference between the reference heading and the actual heading satisfying the switching angle for the threshold time duration. In other words, the actual heading of the machine 100 changing from non-opposing to opposing the reference heading, at the switching angle, does not immediately trigger inversion of the command until an angular difference satisfying the switching angle is maintained for at least the threshold time duration. Similarly, the actual heading of the machine 100 changing back from opposing to non-opposing the reference heading, at the switching angle, does not immediately trigger performing the command without inversion until an angular difference below the switching angle is maintained for at least the threshold time duration. In this way, ping-ponging between inversion of the command and performing the command without inversion, which could be confusing to the operator, may be avoided.

Similarly, if the command is to propel and/or steer the machine 100, then the controller 122 may cause (e.g., by outputting a signal to the undercarriage 104) propelling and/or steering of the machine 100 based on the command with respect to the reference heading for the machine 100 and regardless of the actual heading of the machine 100, in a similar manner as described above. For example, if the reference heading and the actual heading are opposing headings, then to cause propelling and/or steering of the machine 100 based on the command, the controller 122 may cause propelling and/or steering of the machine 100 according to an inversion of the command. For example, if the command is to propel the machine 100 forward, from the perspective of the operator, the controller 122 may invert the command and cause propelling of the machine 100 in reverse from the perspective of the machine 100.

The controller 122 may have set the reference heading while the remote control device 126 was at a first location, and subsequently, the controller 122 may detect a movement of the remote control device 126 from the first location to a second location. The controller 122 may detect the movement based on location data associated with the remote control device 126. For example, the controller 122 may periodically receive information indicating a location of the remote control device 126, which the controller 122 may use to determine the first location and the second location.

The controller 122 may adjust the reference heading based on the movement of the remote control device 126 from the first location to the second location. An adjustment made by the controller 122 to the reference heading may be based on an angle between a line through the machine 100 along the reference heading and a line projecting from the second location to the line through the machine 100 at a point on the machine 100. For example, the controller 122 may adjust the reference heading by rotating the reference heading in accordance with the angle. In this way, subsequent commands that the controller 122 receives from the remote control device 126 may be carried out by the controller 122 in accordance with the adjusted reference heading, in a similar manner as described above.

As indicated above, FIG. 2 is provided as an example. Other examples may differ from what is described with regard to FIG. 2.

Figure 3:
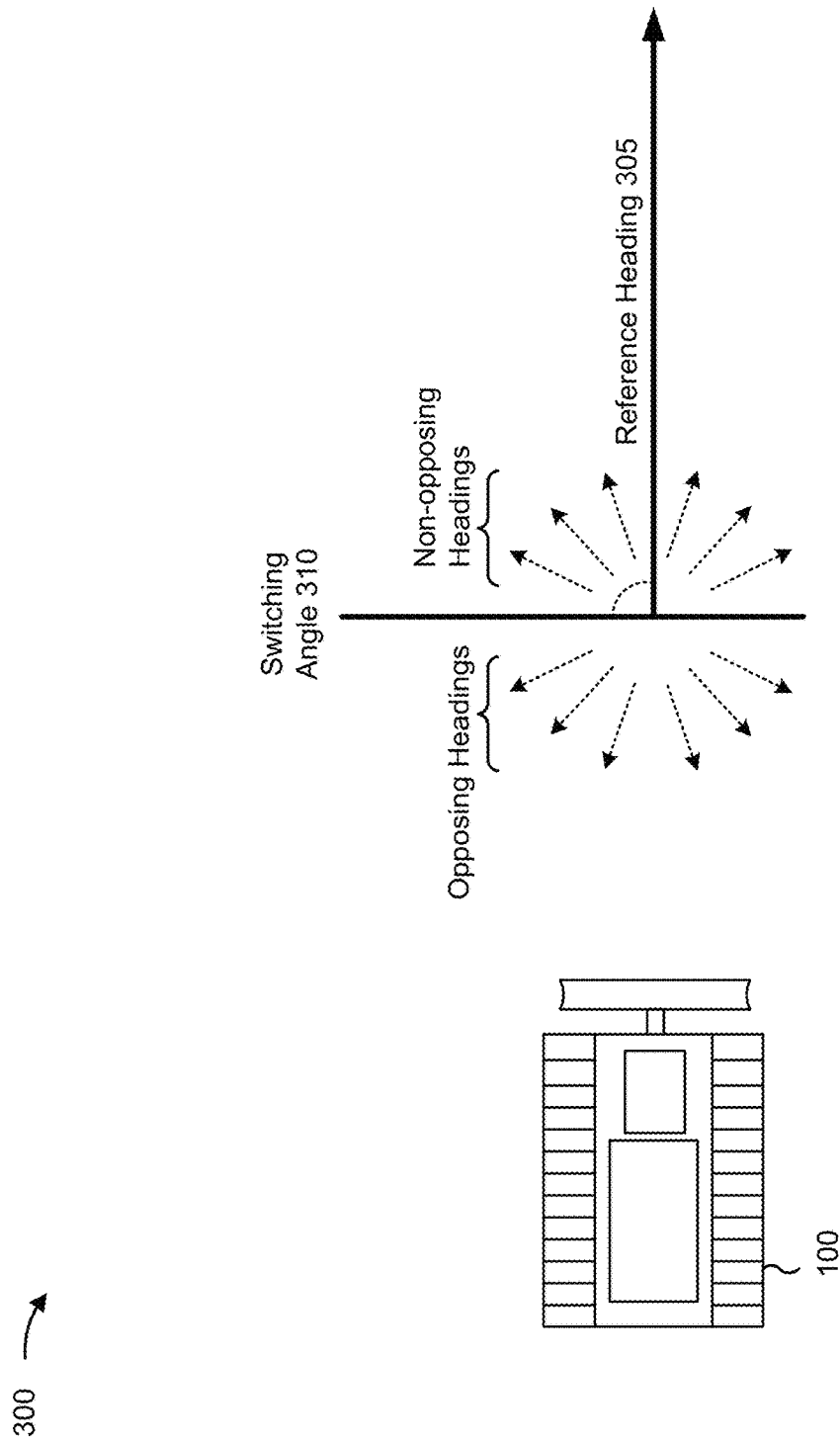
FIG. 3 is a diagram of an example associated with remote control of an implement of a machine.

FIG. 3 is a diagram of an example 300 associated with remote control of an implement of a machine. As shown in FIG. 3, a heading of the machine 100 may be non-opposing to a reference heading 305 if an angular difference between the heading and the reference heading 305 is below a switching angle 310 (e.g., 90 degrees). As further shown in FIG. 3, a heading of the machine 100 may be opposing to the reference heading 305 if an angular difference between the heading and the reference heading 305 satisfies (e.g., is greater than, or is greater than or equal to) the switching angle 310.

As indicated above, FIG. 3 is provided as an example. Other examples may differ from what is described with regard to FIG. 3.

FIG. 4 is a diagram of an example 400 associated with remote control of an implement of a machine. As described herein, whether a command is inverted or performed without inversion may be based on an angular difference 415 between a reference heading 405 and an actual heading 420 of the machine 100. For example, if the angular difference 415 is greater than the first threshold for inversion, then the command is inverted, and if the angular difference 415 is less than a second threshold for non-inversion, then the command is performed without inversion. In other words, if commands are currently performed without inversion, then the commands may continue to be performed without inversion until the angular difference 415 is greater than the first threshold, and if commands are currently inverted, then the commands may continue to be inverted until the angular difference 415 is less than the second threshold. As an example, whether a command is inverted or performed without inversion may be based on an angular difference 415 between the reference heading 405 and the actual heading 420 having a threshold deviation from the switching angle 410.

As indicated above, FIG. 4 is provided as an example. Other examples may differ from what is described with regard to FIG. 4.

Figure 5:
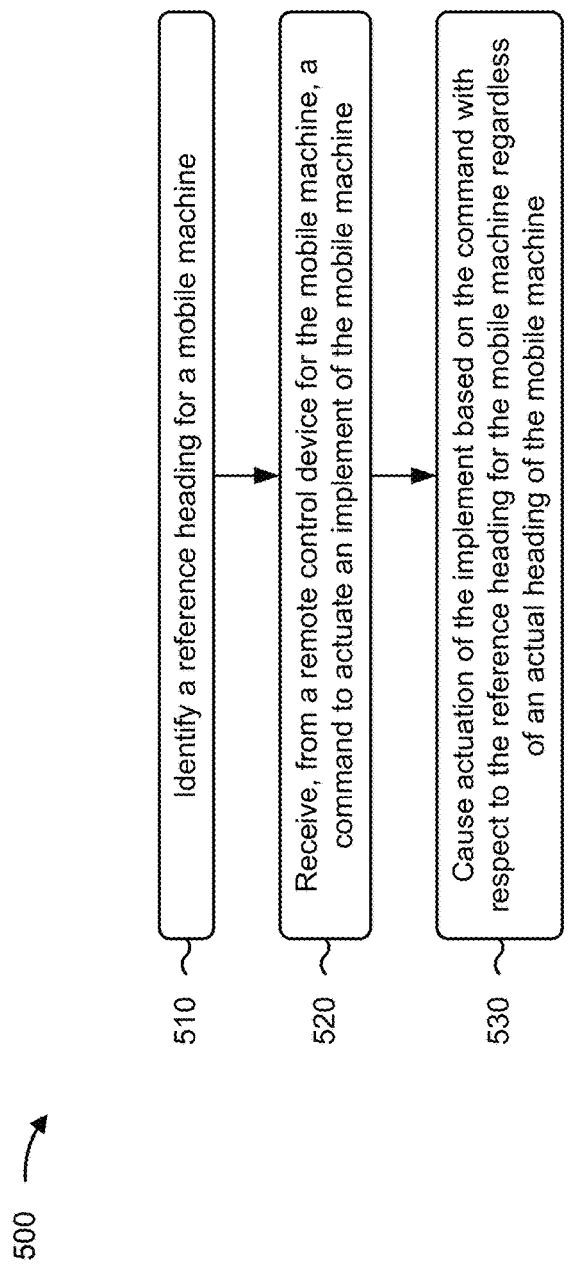
FIG. 5 is a flowchart of an example process associated with remote control of an implement of a machine.

FIG. 5 is a flowchart of an example process 500 associated with remote control of an implement of a machine. One or more process blocks of FIG. 5 may be performed by a controller (e.g., controller 122). Additionally, or alternatively, one or more process blocks of FIG. 5 may be performed by another device or a group of devices separate from or including the controller, such as another device or component that is internal or external to machine 100.

As shown in FIG. 5, process 500 may include identifying a reference heading for a mobile machine (block 510). For example, the controller may identify a reference heading for a mobile machine, as described above. Identifying the reference heading for the mobile machine may include receiving, from a remote control device, an indication to use a current heading of the mobile machine as the reference heading for the mobile machine. Process 500 may include detecting the current heading of the mobile machine based on at least one of a compass heading of the mobile machine, a GNSS heading of the mobile machine, and/or an output of an IMU of the mobile machine. Identifying the reference heading for the mobile machine may include mapping the reference heading to a particular cardinal direction. Identifying the reference heading for the mobile machine may include identifying a heading of the mobile machine used when steering of the mobile machine via the remote control device was last performed, and using the heading as the reference heading.

As further shown in FIG. 5, process 500 may include receiving a command to actuate an implement of the mobile machine (block 520). For example, the controller may receive a command to actuate an implement of the mobile machine, as described above. The command to actuate the implement may indicate a rotation of the implement relative to a work surface or a translation of the implement relative to the work surface. For example, the command to actuate the implement may be a blade angle command or a blade tilt command.

As further shown in FIG. 5, process 500 may include causing actuation of the implement based on the command with respect to the reference heading for the mobile machine regardless of an actual heading of the mobile machine (block 530). For example, the controller may cause actuation of the implement based on the command with respect to the reference heading for the mobile machine regardless of an actual heading of the mobile machine, as described above.

The reference heading and the actual heading may be opposing headings, and causing actuation of the implement based on the command with respect to the reference heading may include causing actuation of the implement according to an inversion of the command. Causing actuation of the implement based on the command with respect to the reference heading may include causing actuation of the implement according to the command without inversion based on an angular difference between the actual heading and the reference heading being less than an angle threshold. Causing actuation of the implement based on the command with respect to the reference heading may include causing actuation of the implement according to an inversion of the command based on an angular difference between the actual heading and the reference heading satisfying an angle threshold.

Causing actuation of the implement based on the command with respect to the reference heading may include causing actuation of the implement according to an inversion of the command, or according to the command without inversion, based on whether an angular difference between the actual heading and the reference heading is greater than a first threshold for inversion of commands or less than a second threshold for non-inversion of commands. For example, the reference heading and the actual heading may be opposing headings, and causing actuation of the implement may include causing actuation of the implement according to the inversion of the command based on the angular difference being greater than the first threshold. As another example, the reference heading and the actual heading may be non-opposing headings, and causing actuation of the implement may include causing actuation of the implement according to the command without inversion based on the angular difference being less than the second threshold.

The command may further indicate to propel or steer the mobile machine, and causing actuation of the implement may include causing actuation of the implement, and propelling or steering of the machine, according to the inversion of the command, or according to the command without inversion, based on whether the angular difference between the actual heading and the reference heading is greater than the first threshold for inversion of commands or less than the second threshold for non-inversion of commands. Process 500 may include detecting a movement of the remote control device from a first location to a second location, and adjusting the reference heading based on the movement of the remote control device from the first location to the second location.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

INDUSTRIAL APPLICABILITY

The control system described herein may be used with any machine that is operable by remote control. For example, the control system may be used with a machine that includes an implement for engaging a work surface to move material and/or otherwise alter the work surface, such as a dozer, an excavator, a motor grader, a plow, a paver, a skid steer loader, or a compact wheel loader. Generally, remote control operation of a machine may be from a machine-centric perspective. In other words, the machine may interpret commands from a remote control from the perspective of the machine, rather than from the perspective of an operator of the remote control. Accordingly, machine-centric remote control may be confusing to the operator resulting in slow, inefficient operation of the machine that wastes machine hours and fuel (or another energy source), among other examples.

The control system described herein is useful for causing actuation of the implement, in response to a command received from a remote control, from a field-centric perspective. In particular, the control system may cause actuation of the implement based on the command with respect to a reference heading of the machine and regardless of an actual heading of the machine. In this way, the control system provides intuitive remote control operation of the implement. Accordingly, the control system may facilitate fast, efficient operation of the machine that conserves machine hours and fuel, among other examples.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A controller of a mobile machine having an implement, comprising:
    one or more memories; and
    one or more processors configured to:
        receive, from a remote control device for the mobile machine, an indication to use a current heading of the mobile machine as a reference heading for the mobile machine;
        receive, from the remote control device, a command to actuate an implement of the mobile machine, the command to actuate the implement indicating a rotation of the implement;
        detect an actual heading of the mobile machine that is different from the reference heading; and
        cause actuation of the implement according to an inversion of the command, or according to the command without inversion, based on whether an angular difference between the actual heading and the reference heading is greater than a first threshold for inversion of commands or less than a second threshold for non-inversion of commands.

2. The controller of claim 1, wherein the reference heading and the actual heading are opposing headings, and
    wherein the one or more processors, to cause actuation of the implement, are configured to:
        cause actuation of the implement according to the inversion of the command based on the angular difference being greater than the first threshold.

3. The controller of claim 1, wherein the reference heading and the actual heading are non-opposing headings, and
    wherein the one or more processors, to cause actuation of the implement, are configured to:
        cause actuation of the implement according to the command without inversion based on the angular difference being less than the second threshold.

4. The controller of claim 1, wherein the one or more processors are further configured to:
    detect a movement of the remote control device from a first location to a second location; and
    adjust the reference heading based on the movement of the remote control device from the first location to the second location.

5. The controller of claim 1, wherein the one or more processors are further configured to:
    detect the current heading of the mobile machine based on at least one of:
        a compass heading of the mobile machine,
        a global navigation satellite system heading of the mobile machine, or
        an output of an inertial measurement unit of the mobile machine.

6. The controller of claim 1, wherein the command to actuate the implement is a blade angle command or a blade tilt command.

7. The controller of claim 1, wherein the mobile machine is a dozer, a motor grader, or an excavator.

8. The controller of claim 1, wherein the command further indicates to propel or steer the mobile machine, and wherein the one or more processors, to cause actuation of the implement, are configured to:
cause actuation of the implement, and propelling or steering of the machine, according to the inversion of the command, or according to the command without inversion, based on whether the angular difference between the actual heading and the reference heading is greater than the first threshold for inversion of commands or less than the second threshold for non-inversion of commands.

9. A method, comprising:
identifying, by a controller, a reference heading for a mobile machine;
receiving, by the controller from a remote control device for the mobile machine, a command to actuate an implement of the mobile machine; and
causing, by the controller, actuation of the implement based on the command with respect to the reference heading for the mobile machine regardless of an actual heading of the mobile machine.

10. The method of claim 9, wherein identifying the reference heading for the mobile machine comprises:
receiving, from the remote control device, an indication to use a current heading of the mobile machine as the reference heading for the mobile machine.

11. The method of claim 9, wherein identifying the reference heading for the mobile machine comprises:
mapping the reference heading to a particular cardinal direction.

12. The method of claim 9, wherein identifying the reference heading for the mobile machine comprises:
identifying a heading of the mobile machine used when steering of the mobile machine, via the remote control device, was last performed; and
using the heading as the reference heading.

13. The method of claim 9, wherein the reference heading and the actual heading are opposing headings, and
wherein causing actuation of the implement based on the command with respect to the reference heading comprises:
causing actuation of the implement according to an inversion of the command.

14. The method of claim 9, wherein causing actuation of the implement based on the command with respect to the reference heading comprises:
causing actuation of the implement according to the command without inversion based on an angular difference between the actual heading and the reference heading being less than an angle threshold.

15. The method of claim 9, wherein causing actuation of the implement based on the command with respect to the reference heading comprises:
causing actuation of the implement according to an inversion of the command based on an angular difference between the actual heading and the reference heading satisfying an angle threshold.

16. The method of claim 9, wherein causing actuation of the implement based on the command with respect to the reference heading comprises:
causing actuation of the implement according to an inversion of the command, or according to the command without inversion, based on whether an angular difference between the actual heading and the reference heading is greater than a first threshold for inversion of commands or less than a second threshold for non-inversion of commands.

17. The method of claim 9, wherein the command to actuate the implement indicates a rotation of the implement relative to a work surface or a translation of the implement relative to the work surface.

18. A mobile machine, comprising:
an undercarriage configured to propel the mobile machine;
a frame supported on the undercarriage;
an implement movable with respect to the frame; and
a controller configured to:
receive, from a remote control device for the mobile machine, a command to actuate the implement; and
cause actuation of the implement based on the command with respect to a reference heading for the mobile machine regardless of an actual heading of the mobile machine.

19. The mobile machine of claim 18, wherein the reference heading and the actual heading are opposing headings, and
wherein the controller, to cause actuation of the implement based on the command with respect to the reference heading, is configured to:
cause actuation of the implement according to an inversion of the command.

20. The mobile machine of claim 18, wherein the controller, to cause actuation of the implement based on the command with respect to the reference heading, is configured to:
cause actuation of the implement according to an inversion of the command, or according to the command without inversion, based on whether an angular difference between the actual heading and the reference heading is greater than a first threshold for inversion of commands or less than a second threshold for non-inversion of commands.

* * * * *